United States Patent
Linden

[11] Patent Number: 5,208,314
[45] Date of Patent: May 4, 1993

[54] DUAL CURE CASTING RESIN

[75] Inventor: Gary L. Linden, Centerville, Ohio

[73] Assignee: DAP Products Inc., Tipp City, Ohio

[21] Appl. No.: 789,385

[22] Filed: Nov. 6, 1991

Related U.S. Application Data

[63] Continuation of Ser. No. 537,654, Jun. 14, 1990, abandoned.

[51] Int. Cl.⁵ .................... C08G 18/08; C08F 20/26
[52] U.S. Cl. ...................................... 528/50; 528/65; 525/440; 525/455
[58] Field of Search ................. 528/50, 65; 525/440, 525/455

[56] References Cited

U.S. PATENT DOCUMENTS

| | | | |
|---|---|---|---|
| 2,879,250 | 3/1959 | Eisenmann et al. | 528/50 |
| 4,202,946 | 5/1980 | Smith et al. | 528/72 |
| 4,335,218 | 6/1982 | De Guiseppi | 521/99 |
| 4,396,749 | 8/1983 | van Ballegooijen et al. | 525/440 |
| 4,552,917 | 11/1985 | O'Connor et al. | 524/590 |

Primary Examiner—John Kight, III
Assistant Examiner—John M. Cooney, Jr.
Attorney, Agent, or Firm—Biebel & French

[57] ABSTRACT

The use of a monomer as the solvent in both components of a urethane polymerization system eliminates the need for the expenditure of much energy to remove solvent from the cured resin. The exotherm of the urethane cure supplies the heat for the activation of a relatively thermally stable free radical catalyst which then catalyzes the curing of the monomer. The two component system is stable in storage.

9 Claims, No Drawings

DUAL CURE CASTING RESIN

This is a continuation of co-pending application Ser. No. 537,654, filed Jun. 14, 1990, now abandoned.

This invention relates to a new method for casting a urethane resin. More particularly, it relates to a binary resin casting system wherein an organic monomer acts as a solvent for the urethane forming reactants and for the reaction mixture but polymerizes as the result of catalysis by free radicals generated when a relatively stable organic hydroperoxide is converted in the reaction mixture to a peroxide which is decomposed by the heat generated by the condensation of a polyisocyanate with a polyol.

The viscosity of polyisocyanate/polyol reaction mixture increases rapidly as the reaction proceeds toward the formation of a solid resin. For this reason, a solvent is normally employed so that proper placement of a flowable resinous product may be achieved. It is usually desirable to remove the solvent from the molded product but the energy requirements are high and the removal from thick sections of the product is especially difficult. The potential pollution is also a problem.

It is known to use monomers as solvents and to avoid the removal problems by subsequently polymerizing them. Radiation of the monomer/solvent in the resin is a neat, clean, and effective way to overcome one kind of pollution problem but it is very expensive and it creates another kind of pollution problem. The polymerization of the monomer by the introduction and decomposition of a heat activated, free radical generating catalyst is taught in U.S. Pat. No. 4,552,917, along with the advantages of a one-component storage stable system comprising a modified urethane oligomer containing terminal ethylenic unsaturation, a monomer, and the free radical catalyst. The catalyst is added to the system after the exothermic condensation of a diisocyanate and polyol is complete and the ethylenic unsaturation is introduced by the reaction of residual isocyanate groups with a hydroxyalkyl acrylate or the like.

It is an object of this invention to provide a binary system whereby the mixing of two shelf-stable components initiates the formation of an unstable peroxide from a thermally stable hydroperoxide, the exothermic condensation of a polyisocyanate and a polyol, and the polymerization of a monomer which had been acting as a solvent in the system.

It is another object of this invention to provide a storage stable two-package casting resin system wherein solvent removal is not required.

These and other objects of the invention which will become apparent have been accomplished through the discovery that the thermally stable hydroperoxide will react with a polyisocyanate to form a less stable peroxycarbamate whose decomposition during the exothermic condensation of the remaining polyisocyanate with a polyol causes a monomer/solvent to polymerize and become part of the cured resin.

Thus, one aspect of the invention is a polymerization system comprising a polyisocyanate, a polyol, an organic monomer which is polymerizable in the presence of a free radical, and a peroxycarbamate. Such a system is formed by mixing the polyisocyanate and the monomer as the first part of a two-part storage stable system, mixing the polyol with the thermally stable hydroperoxide as the second part, and, when casting of the resin is desired, mixing the two parts.

For the purposes of this invention, a thermally stable hydroperoxide is one which has a decomposition temperature of about 100° C. (212° F.) or higher. They are exemplified by t-butyl hydroperoxide, cumene hydroperoxide, and cyclohexyl hydroperoxide.

Polyisocyanates and polyisothiocyanates having the formula $R(N=C=X)_n$ where R is an aliphatic radical having from 2 to about 20 carbon atoms, a cycloaliphatic radical having from 4 to about 20 carbon atoms, an aromatic or alkyl aromatic radical having from 6 to about 20 carbon atoms, n is an integer of 2 or 3 and X is oxygen or sulfur are suitable. Examples include diphenyl diisocyanates; 2,4,4'-triisocyanate-diphenyl ether; triphenyl methane triisocyanate; benzene-1,2,4-triisocyanate; naphthalene-1,3,7-triisocyanate; meta or paraphenylene diisocyanate; diphenyl methane diisocyanates; bitolylene diisocyanates; dianisidine diisocyanates; isophorone diisocyanates; toluene diisocyanates, hexamethylene diisocyanate, pentamethylene diisocyanate, and their sulfur analogs. Polyisocyanates derived from aniline/formaldehyde condensation resins are also suitable. A polyisocyanate compound containing an isocyanurate, such as the trimerized polyisocyanate taught in U.S. Pat. No. 4,265,798, or allophanate groups or biuret groups may be used, also. Polyisocyanates wherein R is a mixture of aliphatic and aromatic radicals, such as that sold by Mobay Chemical Company under the trademark Mondur HL, are also contemplated. Mixtures of two or more of the polyisocyanate compounds having the $-N=C=X$ radical are also suitable.

Suitable polyols include diols, triols, and higher multihydroxy compounds such as propylene glycol, glycerol, trimethylolpropane, pentaerythritol and the polyoxyalkylene polyols that are derived from them by condensation with an alkylene oxide. Other suitable polyols are made by the alkoxylation of a diamine or higher polyamine such as ethylene diamine, phenylene diamine, triethylame tetramine, tetraethylenepentamine and the like. The amine-based polyols provide the curing catalyst whereas the hydroxyl-based polyols require a separate catalyst such as triethylamine. The average functionality of the polyol may be from about 2 to about 8, and it is preferably about 3 or greater when the average functionality of the polyisocyanate is no more than 2.

Vinyl, vinylidene, and allyl monomers are, in general, representative of the monomers that are polymerizable in the presence of a free radical. The vinyl ethers are among the exceptions. Preferably, the monomer is one that can serve as a solvent at atmospheric pressure and at temperatures that may be encountered during storage, i.e., up to about 120° F. (49° C.).

Normally liquid but low boiling monomers such as vinyl acetate may be used but care must be taken to provide containers which will withstand the pressure build up that may occur. Examples of the monomers contemplated for this invention include styrene, vinyl toluene, chlorostyrene, the acrylic and substituted acrylic esters such as methyl methacrylate; 2-ethylhexyl acrylate; butylmethacrylate, isodecyl methacrylate, and 1,6-hexanediol dimethacrylate. Other suitable monomers are exemplified by N,N-dimethylacrylamide, vinylpyridine, and N-vinyl-pyrrolidone. Mixtures of monomers may be employed. The same monomer may be used as a solvent in both parts of the system or different monomers may be used in the two parts.

The amount of the monomer/solvent employed may be varied over a wide range in keeping with the viscosity control which is its initial function. It may be, therefore, from about 2 to about 50 parts by weight per 100 parts of the total weight of the polyisocyanate and the polyol but preferably is from about 20 to about 50 parts on that basis.

Mixing of the two parts of the polymerization system is normally done at ambient temperatures such as about 68° F. to about 77° F. (20°-25° C.). The two parts may be mixed in a static mixing head connected to the mold. Because the reaction is very exothermic, external cooling of the mold may be necessary. Closed, pressurable molds should be used when volatile monomers are used as the solvent. Fillers and reinforcements such as limestone, glass microbubbles, glass fibers, and the like serve as heat sinks and help to moderate the temperature. Contamination of the reaction mixture with moisture must be avoided to prevent the formation of bubbles in a molded part if, indeed, such bubbles are undesired.

Gelation of the polyurethane reaction mixture is much faster in the system of this invention as compared to the condensation of the polyisocyanate and polyol in an aromatic solvent of the type often used to control viscosity. Also, the phasing out or precipitation of the gelled polyurethane is desirable for a system of this invention because the polymerization of the monomer trapped in the gel reduces the shrinkage of the cast part.

The invention is further illustrated by the following working examples. All parts are by weight unless otherwise specified.

EXAMPLES 1-6

Part A of the casting resin of each example consisted of 40 parts of a tetrapropoxylated ethylenediamine (sold under the trademark Quadrol by BASF), 58 parts of the solvent named in Table I, and 2 parts of cumene hydroperoxide. The Control contained 60 parts of the solvent but no cumene hydroperoxide. Part B consisted of 70 parts of an aromatic polyisocyanate (sold under the trademark Mondur MR by Mobay Chemical) and 30 parts of the solvent. Thirty parts each of Parts A and B were mixed in a beaker, unless otherwise indicated, without external heat and the gel time and peak temperature were observed along with the presence or absence of opacity in the gel which is indicated in Table I as Phase Out.

TABLE I

| Example | Solvent | Time to Gel | Peak Exotherm | Phase Out at gelation |
|---|---|---|---|---|
| Control | Hisol* 10 | 3' 15" | 89° C. | Yes |
| 1 | Styrene | 1' 15" | 135.5° C. | No |
| 2 | 2-ethyl hexyl acrylate | 1' 5" | 156.4° C. | Yes |
| 3 | Vinyl acetate | 2' 5" | 80.7° C. (evaporative cooling) | Yes in open cup - No in closed bottle |
| 4 | Butyl methacrylate | 45" | 170° C. | Yes |
| 5 | BMA-styrene (50-50 by wt) | 1' 10" | 162.1° C. | Yes |
| 6 | 1,6-hexanediol dimethacrylate** | 15" | 200° C. | Yes |

*Hisol is a trademark of Ashland Chemical Company for an aromatic hydrocarbon solvent
**Sartomer SR-239

In another Control sample wherein 50 parts of a Hisol 10/Quadrol (60:40) solution were mixed with 50 parts of a Hisol 10/Mondur MR(30:70) solution, gelation occurred in 2'30" and the temperature rose to 115° C. When 2 parts of the Hisol 10 solvent were replaced by cumene hydroperoxide, the gel time was unchanged and the peak temperature was 122° C.

EXAMPLES 7-9

In each of these examples, a filler was added to 101 parts of a solution of styrene, Quadrol, and cumene hydroperoxide (60:40:1) in the amount and of the kind shown under Part A in Table II. Then, 100 parts of a 70:30 styrene/Mondur MR solution (Part B) was added to each of the Part A mixtures. The Control here did not contain a filler so that the effects of a filler on the gel time and temperature could be observed.

TABLE II

| | Part A Filler | | | |
|---|---|---|---|---|
| | Kind | Amount | Gel time | Peak exotherm |
| Control | — | — | 2' 20" | 337° F. (169° C.) |
| Ex. 7 | glass bubbles | 15 parts | 2' 26" | 267° F. (131° C.) |
| Ex. 8 | glass bubbles | 10 parts | 2' 22" | 319° F. (159° C.) |
| Ex. 9 | limestone | 70 parts | 5' 0" | 155° F. (68° C.) |

EXAMPLE 10

The general procedure of Examples 1-6 was used except that 70 parts of a propoxylated pentaerythritol sold under the trademark PEP 550 by BASF was used in Part A along with 28 parts of isodecyl methacrylate, 2 parts of cumene hydroperoxide and sufficient triethylamine to catalyze the reaction of the polyol and isocyanate. The solvent/monomer in Part B was isodecyl methacrylate, also. The gel time was 22½ minutes and the peak temperature was 103° C. (217° F.). Phase out occurred.

The subject matter claimed is:

1. In an exothermic condensation reaction polymerization system for forming a solid polyurethane resin and a second solid resin within said polyurethane resin, the combination comprising:
   a polyisocyanate reactant and a polyol reactant for entering into said exothermic condensation reaction to form said polyurethane;
   a solvent for said polyurethane reaction, said solvent comprising a liquid organic monomer capable of undergoing free radical polymerization to form said second resin;
   an organic hydroperoxide compound adapted to form a free radical polymerization initiator in said system to initiate polymerization of said organic monomer to eliminate need for removing said solvent from said system.

2. A combination in accordance with claim 1 wherein said organic hydroperoxide compound is a member selected from t-butyl hydroperoxide, cumene hydroperoxide, and cyclohexyl hydroperoxide.

3. A combination as recited in claim 2 wherein said organic hydroperoxide is cumene hydroperoxide.

4. In a method of conducting a heat generating condensation reaction to form a solid polyurethane resin and a second solid resin within said polyurethane resin, the method comprising:
   (a) providing a reaction medium comprising a polyisocyanate reactant and a polyol reactant for entering into said heat generating condensation reaction to form said polyurethane resin;

(b) providing a solvent for said reaction medium wherein said solvent comprises a liquid organic monomer capable of undergoing free radical polymerization to form said second resin;

(c) providing an organic hydroperoxide in said reaction medium;

(d) forming a free radical polymerization initiator from said organic hydroperoxide in said reaction medium by heat generated in said reaction medium; and (e) polymerizing said organic monomer to form said second resin by catalytic action of said free radical polymerization initiator thereby eliminating need for removal of said solvent from said reaction medium.

5. Method as recited in claim 4 wherein said step of forming a free radical polymerization initiator comprises reacting said organic hydroperoxide with said polyisocyanate to form a peroxycarbamate compound in situ, said peroxycarbamate compound decomposing via heat generated in said reaction to form said free radical polymerization initiator.

6. Method as recited in claim 4 comprising providing a first storage stable component mixture including said polyisocyanate and said solvent, providing a second storage stable component mixture comprising said polyol and said organic hydroperoxide, and mixing said first and second component mixtures together.

7. Method as recited in claim 6 comprising mixing said first and second component mixtures together at ambient temperature.

8. Method as recited in claim 4 comprising performing said method in a mold cavity.

9. Combination as recited in claim 1 wherein said polyisocyanate reactant and said solvent are provided as a first storage stable component and wherein said polyol reactant and said organic hydroperoxide compound are provided as a separate second storage stable component to be mixed with said first storage stable component.

* * * * *